March 1, 1927.
P. D. ECONOPOULY
1,619,500
AUTOMATIC CUT-OFF FOR PRESSURE FLUID SUPPLY LINES
Filed Oct. 11, 1923
2 Sheets-Sheet 1
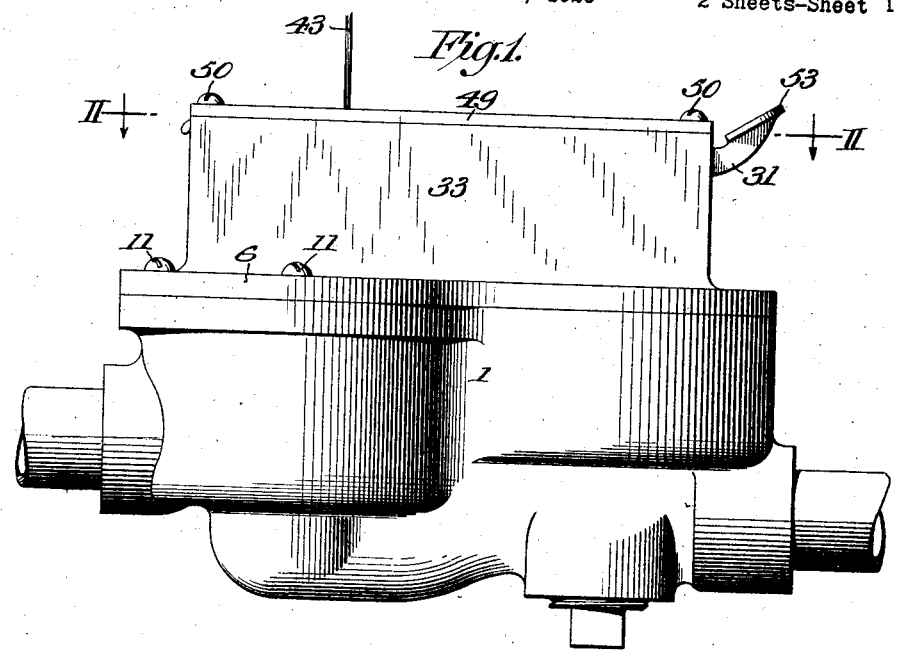
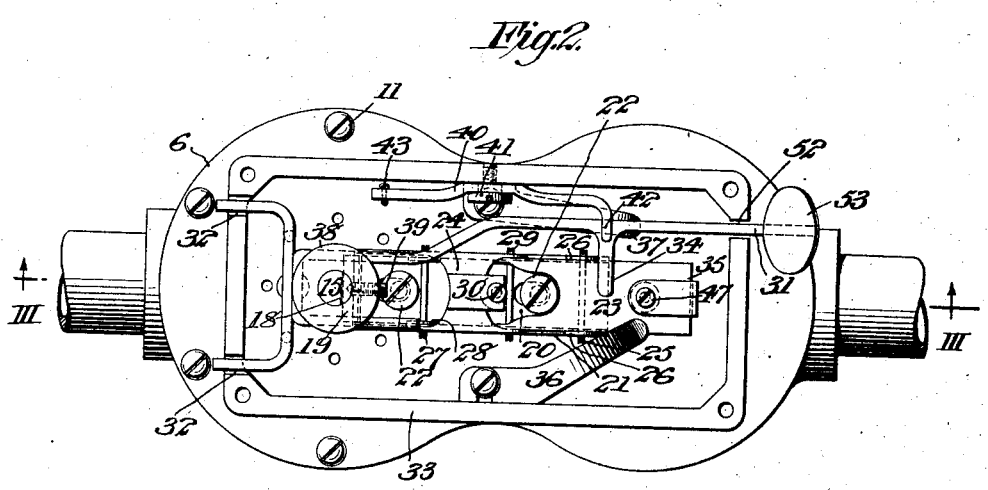
INVENTOR
BY
ATTORNEYS March 1, 1927.

P. D. ECONOPOULY 1,619,500

AUTOMATIC CUT-OFF FOR PRESSURE FLUID SUPPLY LINES

Filed Oct. 11, 1923　　2 Sheets-Sheet 2

INVENTOR
Peter D. Econopouly
BY
ATTORNEYS

Patented Mar. 1, 1927.

1,619,500

UNITED STATES PATENT OFFICE.

PETER D. ECONOPOULY, OF PORT JEFFERSON, NEW YORK.

AUTOMATIC CUT-OFF FOR PRESSURE-FLUID-SUPPLY LINES.

Application filed October 11, 1923. Serial No. 667,942.

This invention relates to automatic cut-offs for fluid pressure supply lines and has for its object to provide for automatically cutting off the flow of gas, when from any cause the pressure falls below a predetermined point, as for instance, by a disconnection or other leak in the line.

Another object includes a means for manually operating the cut-off valve to close the supply, which means may be provided with a flexible connection disposed at a convenient place readily accessible to an operative not immediately in touch with the device, whereby the flow of gas may be cut-off, as in the case of fire or other causes.

Another object is to provide certain improvements in the form, construction and arrangement of the several parts whereby the above named and other objects may be effectively attained.

A practical embodiment of my invention is represented in the accompanying drawings, in which—

Fig. 1 represents a side elevation of my improved cut-off device with the parts in the positions they assume when the cut-off valve is open and the pressure is normal.

Fig. 2 represents a horizontal section taken in the plane of the line II—II of Fig. 1, looking in the direction of the arrows.

Figure 3:
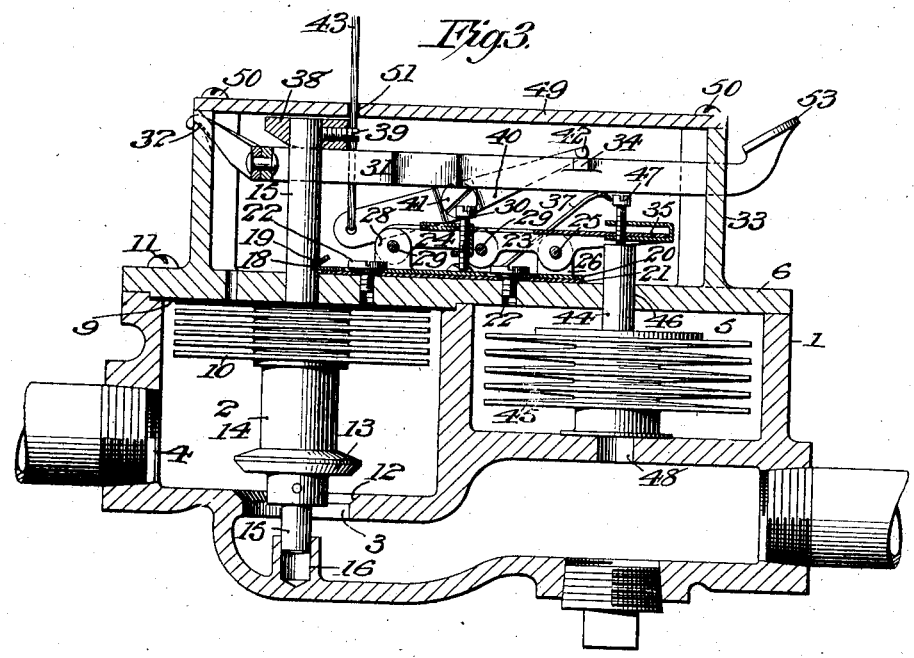
Fig. 3 represents a vertical section taken in the plane of the line III—III of Fig. 2, looking in the direction of the arrows.

The casing of the device is denoted by 1 and comprises a fluid pressure chamber 2 having ports 3 and 4 and an equalizing chamber 5. The fluid pressure and equalizing chambers are closed by a member 6. The periphery of a diaphragm 9 of a bellows 10 is clamped between the member 6 and the walls surrounding the fluid pressure chamber to form a fluid tight joint by means of an annular series of screws 11. The bellows 10 forms the movable element of the fluid pressure chamber.

The port 3 is arranged centrally with respect to the bellows 10 and has a seat 12 for the cut-off valve 13, which is carried by a sleeve 14 fast on the bellows 10. The valve 13 is fixed to a vertically arranged pin 15, the lower end of which is stepped in a bearing 16 in the port 3, while the upper end passes through the member 6. This pin 15 guides the valve vertically toward and away from its seat 12.

A spring 17 is located in the sleeve and bellows between the valve 13 and member 6, to act upon the bellows and move it to close the valve when the fluid pressure in the supply line falls to a predetermined point from any cause upon either side of the cut-off.

I have provided a manually "set" automatic means for assisting the fluid pressure in the supply line to hold the cut-off valve open, which means in the present instance is shown as comprising the following elements:

Figure 4:
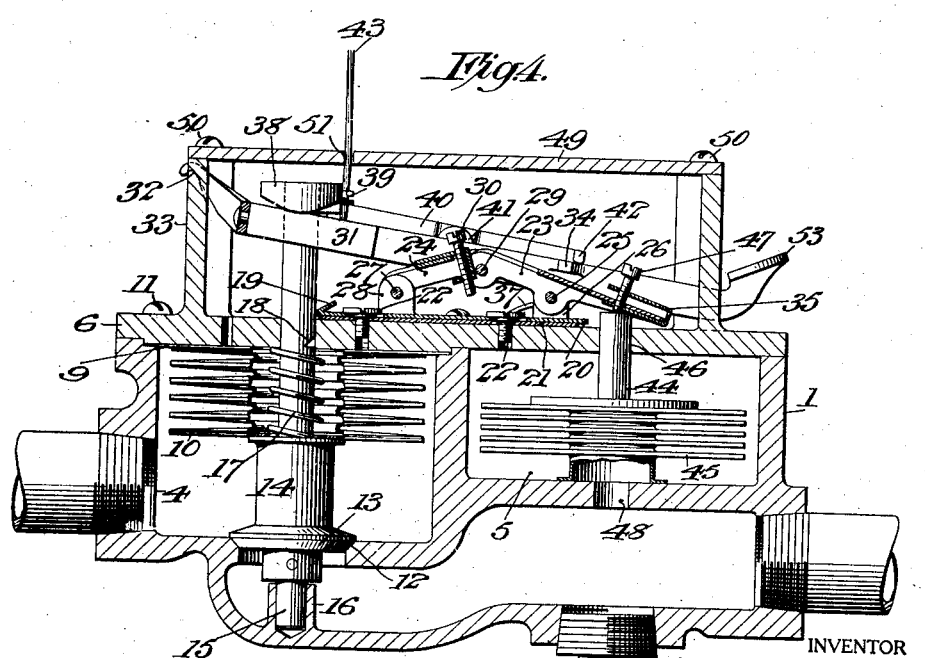
Fig. 4 represents a similar view with the parts in the positions they assume when the pressure has fallen to a predetermined point and the cut-off valve is closed.

The pin 15 which projects through the member 6 is provided with a notch 18 arranged to be engaged by a nose 19 of a laterally movable latch 20, slidably secured in a frame 21, fixed to the member 6, by screws 22. The latch 20 is reciprocated in the frame 21 by means of a toggle having members 23 and 24. The member 23 is mounted to rock on a pivot 25 fixed in a lug 26 carried by the frame 21. The member 24 is pivoted at 27 in ears 28 uprising from the latch 20. The members 23 and 24 are linked together at 29. The lateral movement of the latch 20 is adjustably controlled by means of a screw 30 having a threaded engagement with the member 24 and adapted to engage the latch immediately below. A manually operated lever 31 is hinged at 32 in a housing 33 carried by the member 6, which lever is provided with an arm 34 extending over and in position to engage the free end of the member 23. A spring 36, shown in Fig. 2, is arranged to coact with the free end 35 of the member 23 to assist in breaking the toggle, which breaking moves the latch 20 away from the notch 18 in the pin 15, as shown in Fig. 4. The lever 31 is held at the limit of its upward movement by a spring 37.

The downward movement of the lever 31 is actuated by a collar 38, adjustably secured by a set screw 39 to the pin 15, which collar engages the lever upon the release of the latch 20 accentuated by the spring 17 in the sleeve 14 and bellows 10. The lever 31 may also be manually depressed by a rocking lever 40 pivoted at 41 in the housing 33, one end of which lever has a lateral projection 42 arranged to engage the lever 31, while the other end is provided with a flexible connection 43 which may be extended to a remote location readily accessible to an operative not immediately in touch with the device, whereby the lever may be actuated to cut-off the supply of gas as in the case of fire or other causes before the pressure has fallen below the predetermined point.

The free end of the toggle member 23 is also arranged to be engaged by the upper end of a pin 44 carried by an equalizing diaphragm bellows 45, fixed to move in the chamber 5. This pin 44 is adapted to slide in a hole 46 in the member 6 and engage a screw 47 threaded in the end 35 of the member 23, which screw also provides for the adjustment of the member.

The bellows 45 is open to the fluid pressure through an opening 48 in the bottom of the chamber 5.

The mechanism in the housing 33 is protected by a cover 49 which is secured thereto by screws 50.

The cover 49 has a hole 51 through which the flexible connection 43 passes.

The lever 31 extends through a slot 52 in the housing 33 and for convenience, the outer end of the lever is provided with a thumb piece 53.

In operation:

With the parts in the positions shown in Figs. 1 to 3 inclusive, the fluid pressure will act to expand the bellows 45 which holds the pin 44 in contact with the screw 47, and the members of the toggle in alinement. The latch 20 being seated in the notch 18 in the pin 15, the diaphragm bellows 10 and spring 17 is contracted and the cut-off valve 13 held off its seat. When the fluid pressure falls to a predetermined point because of a break in the supply line, leakage or other condition on either side of the cut-off, the pressure will be relaxed in the bellows 45, which immediately contracts and draws the pin 44 from its position of support of the free end 35 of the member 23 and the spring 36 exerts its tension on the end 35 to rock the member 23, which acts upon the member 24 and withdraws the nose 19 of the latch 20 from the notch 18. The pin 15 is now free to be moved downwardly by the action of the spring 17 which expands the diaphragm bellows 10 and through the sleeve 14 forces the cut-off valve 13 to its seat 12. As the pin moves downwardly the collar 38 will engage the lever 31 and cause it to assume the position shown in Fig. 4.

To manually close the cut-off valve, the rocking lever 40 may be actuated by pulling upwardly on the flexible connection 43, which in turn causes the lateral projection 42 to contact with the lever 31 which is rocked with the lever 40 until the arm 34 engages the free end of the member 23 and breaks the toggle, whereupon the latch 20 is slid laterally, liberating the pin 15 which moves downwardly upon the tension of the spring 17 and allows the cut-off valve to close on its seat.

The parts will remain in the position shown in Fig. 4 with the cut-off valve closed until intentionally released.

When it is desired to permit the cut-off valve to reopen the supply line and reset the mechanism, the lever 31 is moved upwardly by the thumb piece 53, lifting the collar 38 which raises the pin 15 and the valve 13 from its seat 12. As the pressure begins to pass through the port 3, the bellows 45 will be expanded, by reason of the pressure entering through the opening 48, so that the pin 44 will engage the screw 47 in the free end of the toggle member 23 and bring the members into alinement, which movement causes the latch 20 to move the nose 19 into the notch 18 of the pin 15, with the bellows 10 and spring 17 compressed. The cut-off valve being held open, the parts are placed in their "set" position, ready to be again released by a drop in the pressure in the supply line to the required extent or manually released by pulling the flexible connection.

It is evident that various changes may be resorted to in the construction, form and arrangement of the several parts without departing from the spirit and scope of my invention; hence, I do not wish to be limited to the particular embodiment herein shown and described, but—

What I claim is:—

1. An automatic cut-off for pressure fluid supply lines comprising, a casing, a cut-off valve therein having a stem arranged to extend through said casing, reciprocating mechanism located on the exterior of said casing and arranged to engage the extended portion of said stem for holding the valve open, vertically movable means in the casing controlled by the pressure fluid for actuating said reciprocating mechanism, spring means for closing the valve when the pressure falls to a predetermined point, and manually operated means for opening the valve.

2. An automatic cut-off for pressure fluid supply lines comprising, a casing, a cut-off valve therein having a stem arranged to extend through said casing, a notch in the extended portion of said stem, a reciprocating latch arranged to coact with said notch for holding the valve open, mechanism for moving said latch, vertically movable means in the casing controlled by the pressure fluid for actuating said mechanism, spring means for closing the valve when the pressure falls to a predetermined point, and manually operated means for opening the valve.

3. An automatic cut-off for pressure fluid supply lines comprising, a casing, a cut-off valve therein having a stem arranged to extend through said casing, a notch in the extended portion of said stem, a reciprocating latch arranged to coact with said notch for holding the valve open, mechanism for moving said latch, vertically movable means in the casing controlled by the pressure fluid for actuating said mechanism, a spring on the stem interposed between the valve and casing for closing the valve when the pressure falls to a predetermined point, and manually operated means engaging the stem for opening the valve.

4. An automatic cut-off for pressure fluid supply lines comprising, a cut-off valve having a stem provided with a notch, a reciprocating latch arranged to coact with said notch for holding the valve open, a toggle mechanism for moving said latch, vertically movable means controlled by the pressure fluid for actuating said toggle, spring means for closing the valve when the pressure falls to a predetermined point, and manually operated means for opening the valve.

5. An automatic cut-off for pressure fluid supply lines comprising, a cut-off valve having a stem provided with a notch, a reciprocating latch arranged to coact with said notch for holding the valve open, a toggle mechanism for moving said latch, vertically movable means controlled by the pressure fluid for automatically actuating said toggle mechanism, and manually operable means for opening the valve said manually operable means comprising a collar fast on the valve stem and an oscillating lever coacting with said collar, whereby the upward movement of the lever will engage the collar and lift the valve.

6. An automatic cut-off for pressure fluid supply lines comprising, a cut-off valve having a stem provided with a notch, a reciprocating latch arranged to coact with said notch for holding the valve open, a toggle mechanism for moving said latch, vertically movable means controlled by the pressure fluid for automatically actuating said toggle mechanism, and manually operable means for releasing the valve.

7. An automatic cut-off for pressure fluid supply lines comprising, a cut-off valve having a stem provided with a notch, a reciprocating latch arranged to coact with said notch for holding the valve open, a toggle mechanism for moving said latch, vertically movable means controlled by the pressure fluid for automatically actuating said toggle mechanism, and manually operable oscillating means for releasing the valve.

8. An automatic cut-off for pressure fluid supply lines comprising, a cut-off valve having a stem provided with a notch, a reciprocating latch arranged to coact with said notch for holding the valve open, a toggle mechanism for moving said latch, vertically movable means controlled by the pressure fluid for automatically actuating said toggle mechanism, and manually operable oscillating means for releasing the valve, said manually operable means comprising a collar fast on the valve stem, an oscillating lever having an arm arranged to engage the toggle mechanism, and a yielding rocking lever adapted to be brought into engagement with the oscillating lever, whereby the downward movement of the lever will break the toggle mechanism and release the valve.

9. An automatic cut-off for pressure fluid supply lines comprising, a cut-off valve having a stem provided with a notch, a reciprocating latch arranged to coact with said notch for holding the valve open, a toggle mechanism for moving said latch, vertically movable means controlled by the pressure fluid for automatically actuating said toggle mechanism, manually operable means for opening the valve comprising, a collar fast on the valve stem and an oscillating lever coacting with said collar, and manually operable means for releasing the valve including a yielding rocking lever adapted to be brought into engagement with said oscillating lever, whereby the upward movement of the oscillating lever will engage the collar and lift the valve and the downward movement of the oscillating lever will break the toggle mechanism and release the valve.

In testimony, that I claim the foregoing as my invention, I have signed my name this 28th day of August, 1923.

PETER D. ECONOPOULY.